Dr. Benjamin Atkinson's Expanding & Contracting
PESSARY

74482

PATENTED
FEB 18 1868

Witnesses
W. L. Carroll
J. M. Daniels

Inventor
Benjamin Atkinson, M.D.

United States Patent Office.

BENJAMIN ATKINSON, OF DAVENPORT, IOWA.

Letters Patent No. 74,482, dated February 18, 1868.

---

IMPROVEMENT IN PESSARIES.

---

The Schedule referred to in these Letters Patent and making part of the same.

---

TO ALL WHOM IT MAY CONCERN:

Be it known that I, BENJAMIN ATKINSON, M. D., of the city of Davenport, in the county of Scott, and State of Iowa, have invented certain new and useful Improvements in Expanding and Contracting Pessary; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

The use of this surgical instrument is to introduce into the vagina for supporting the uterus.

Figure 1:
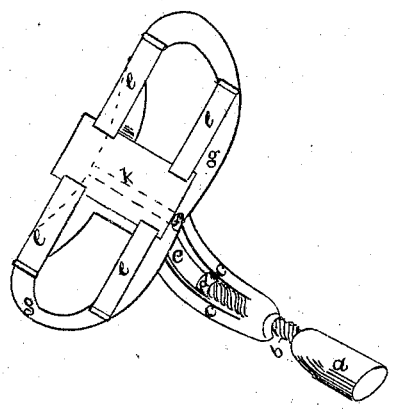
Figure 1 is an isometrical view, shown open wide.
Figure 2:
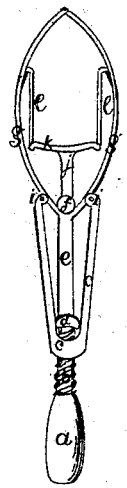
Figure 2 is a front view, shown closed.
Figure 3:
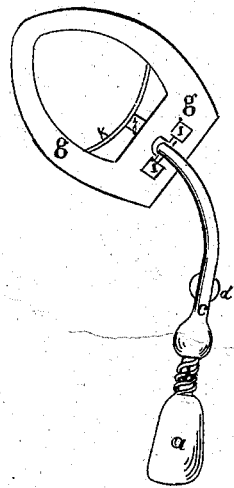
Figure 3 is a side view, shown closed.

$a$ is the handle. $b$ is the screw, secured to the handle and working into the ends of arms $c$. $d$ is a swivel attaching screw $b$ with lever $e$. $f$ shows where lever $e$ is attached to hinge of lips $g$. $ii$ are hinges that secure arms $c\ c$ with lips $g\ g$. $j$ is the continuation of lever $e$, to the end of which is secured a plate, $k$, and to this plate are attached four rubber supporters or attachments, as shown at $l\ l$. Now, by turning the handle a right-hand direction, causes the lips $g$ to separate or open, and give it a left-hand motion causes the lips $g$ to close; and thus, by means of the screw $b$, the lips $g$ can be held in any desired position.

Claim.

What I claim as new, is—

A pessary, consisting of the hinged leaves $g$, arms $c$, with the stem $e$ attached to the leaves $g$ by the rubber strip $l$, and operated by the screw-stem $b$, all constructed and arranged substantially as described.

BENJAMIN ATKINSON, M. D.

Witnesses:
   W. L. CARROLL,
   J. M. DANIELS.